United States Patent [19]

Erickson et al.

[11] 3,846,343

[45] Nov. 5, 1974

[54] PROCESS FOR PREPARING A PLATINUM-RHENIUM CATALYST ON AN ALUMINA SUPPORT

[76] Inventors: Henry Erickson, 400 E. Sibley Blvd., Harvey, Ill. 60426; Saul G. Hindin, 497 Delancy St., Newark, N.J. 07105; Carl D. Keith, 497 Delancy St., Newark, N.J. 07105; John Mooi, 400 E. Sibley Blvd., Harvey, Ill. 60426

[22] Filed: May 2, 1972

[21] Appl. No.: 249,739

Related U.S. Application Data

[63] Continuation of Ser. No. 21,546, March 20, 1970, abandoned.

[30] Foreign Application Priority Data

Feb. 13, 1970 Canada .................................. 74803

[52] U.S. Cl. ........................... 252/466 PT, 208/138
[51] Int. Cl. ............................................. B01j 11/08
[58] Field of Search ...... 252/466 A, 466 B; 208/138

[56] References Cited
UNITED STATES PATENTS

| | | |
|---|---|---|
| 2,809,170 | 10/1957 | Cornelius et al. ............. 252/466 PT |
| 3,251,783 | 5/1966 | Keith et al. ........................... 252/463 |
| 3,415,737 | 12/1968 | Kluksdahl ..................... 252/466 PT |
| 3,434,960 | 3/1969 | Jacobson et al. ............. 252/466 PT |
| 3,507,780 | 4/1970 | Spurlock et al. ............... 252/466 PT |
| 3,558,477 | 1/1971 | Kluksdahl ..................... 252/466 PT |

*Primary Examiner*—Patrick P. Garvin
*Assistant Examiner*—W. J. Shine
*Attorney, Agent, or Firm*—Morton, Bernard, Brown, Roberts and Sutherland

[57] ABSTRACT

Rhenium and platinum series metal-containing, calcined catalysts are prepared by i. drying an aqueous slurry of hydrated alumina to obtain a mixture which can be formed into macrosize particles;

ii. forming the mixture into macrosize particles;

iii. calcining the particles either at very high temperatures or in the presence of water vapor, or both, so as to reduce the surface area of the particles;

iv. impregnating the particles with aqueous solution of platinum series metal compound and aqueous solution of rhenium compound; and v. recalcining the impregnated particles under generally less severe conditions than in (iii) above.

9 Claims, No Drawings

PROCESS FOR PREPARING A PLATINUM-RHENIUM CATALYST ON AN ALUMINA SUPPORT

This is a continuation of application Ser. No. 21,546, filed Mar. 20, 1970 now abandoned.

This invention has as its object the preparation of alumina-supported, rhenium and platinum series metal-containing, calcined catalysts which exhibit improved activity, stability or both. For example, the invention is directed to a process for preparing a catalyst composed of rhenium and platinum on an alumina support, which catalyst, because of its method of preparation, when used to catalyze hydrocarbon conversion operations such as naphtha reforming exhibits high activity and stability, the latter being a measure of the ability of the catalyst to maintain activity, selectivity and regenerability through prolonged periods of use. Also, the catalysts prepared by the method of the invention have good physical strength, so that, when used, for example, in fixed bed operations, substantial crushing or breakage of the catalyst particles is avoided.

Alumina-supported, platinum series metal-containing catalysts have been demonstrated in the prior art to be useful for catalyzing a wide variety of chemical reactions. Illustrative of these reactions are hydrocarbon conversion operations such as reforming. To groom the catalysts for use in particular types of reactions, effective amounts, often minor, of promoters, stabilizers, activators, etc., are often incoporated in the catalysts. Thus, it has been proposed to incorporate minor amounts of rhenium in such catalysts to promote and stabilize their activity for various hydrocarbon conversion operations such as, for example, reforming.

The present invention provides a process for preparing alumina-supported, rhenium and platinum series metal-containing catalyst composites which, due to their method of preparation, exhibit improved activity and/or stability for various hydrocarbon conversion operations, most especially for the catalytic reforming of light, normally liquid hydrocarbon stocks to produce gasoline of enhanced octane value, benzene and other selected aromatics such as toluene or xylenes. The process of the present invention comprises the following steps:

i. drying an aqueous slurry of hydrated alumina to obtain a mixture which can be formed into macrosize particles;

ii. forming the mixture into macrosize particles;

iii. calcining the particles at very high temperatures or in the presence of water vapor, or both, so as to reduce the surface area of the particles;

iv. impregnating the particles with aqueous solution of water-soluble platinum series metal compound and with aqueous solution of water-soluble rhenium compound; and v. recalcining the impregnated particles under generally less severe conditions than in (iii), above.

The several steps of the process are treated in greater detail in the following discussion.

The hydrated alumina slurry which is dried in step (i) often contains, for example, about 5 to 16, say about 8 to 14, weight percent of alumina (calculated as Al$_2$O$_3$). Its preparation may be by various methods known in the art. Thus, for instance, hydrated alumina can be precipitated from an aqueous solution of a soluble aluminum salt such as aluminum chloride. Ammonium hydroxide is a useful agent for effecting the precipitation. Control of the pH to maintain it within the values of about 7 to 10 during the precipitation is desirable. Extraneous ions, such as halide ions, which are introduced in preparing the slurry can, if desired, be removed by filtering the alumina hydrogel from its mother liquor and washing the filter cake with water. Also, if desired, the hydrogel can be aged, say for a period of several days, prior to utilizing it in the process of the present invention. The effect of such aging is to build up the concentration of alumina tri-hydrates in the hydrogel. Such trihydrate formation can also be enhanced by seeding the slurry with crystallites of, for example, gibbsite. Thus, for instance, it is often preferred that a major amount, most preferably about 50 to 95 percent, of the alumina content in the slurry that is dried in step (i) of the process be in the trihydrate form, e.g., as one or more of bayerite, gibbsite or nordstrandite (previously called randomite). Most preferably, a major amount of the trihydrate portion is composed of bayerite or nordstrandite. Catalysts derived therefrom, via calcination, have been found to contain eta alumina. The essential balance of the alumina content of the slurry is composed of one or both of alumina monohydrate (boehmite) and amorphous hydrous alumina.

The drying of the slurry can be accomplished in various manners — for example, by drum drying, flash drying, spray drying, tunnel drying, etc. The purpose of the drying is to obtain a mixture of water and alumina which has a low enough free moisture content that it is suitable for macroforming, which is the next step in the process. The extent of drying will depend, therefore, on the type of macroforming to be employed. Tabletting, for example, generally requires a drier mix than does, say, extruding, which usually calls for a free water content of about 20 to 40 weight percent. The temperature at which the drying is performed is not critical but it is generally preferred to operate at temperatures up to about 400°F. It may be — because of the type of equipment employed, or for whatever reason — that it is preferably to dry the mixture completely, or relatively so, and then add back sufficient water to obtain a formable, e.g. extrudable, mix. Such an operation is within the purview of the instant invention and is intended to be embraced by the recitation: "drying ... to obtain a mixture which can be formed into macrosize particles".

Step (ii) of the process, forming into macrosize particles, can be performed, for example, by tabletting or extruding the mixture, as mentioned above. It is customary, especially in the case of tabletting, to incorporate in the mixture minor amounts of a die lubricant which is either non-deleterious to the final catalyst composite or which can be removed by the subsequent calcining step. Often employed, for example, are organic compounds which, by calcining the formed particles in an atmosphere having a controlled amount of oxygen, can be subsequently burned away without giving rise to excessive temperatures.

The size selected for the catalyst particles can be dependent upon the intended environment in which the catalyst is to be used — as, for example, whether in a fixed or moving bed, etc. Thus, for example, where, as in the preferred embodiment of the present invention, the catalyst is designed for use in reforming operations employing a fixed bed of catalyst, the mixture will preferably be formed into particles having a minimum dimension of at least about 0.01 inch and a maximum dimension of up to about one-half inch, or one inch, or more. Particles having a diameter of about 0.03 to 0.25 inch, preferably about 0.03 to 0.15 inch, are often preferred, especially for use in fixed bed reforming operations.

Calcining of the macrosize particles according to step (iii) of the present process is effected under conditions of temperature and humidity sufficient to effect release of water of hydration from the particles and to reduce their surface area. This involves the use of relatively high calcining temperatures or of a calcining atmosphere which contains a substantial water vapor content, or both. The lowering of the surface area of the particles reflects a reduction in the number of small pores in the alumina — i.e., a reduction in the amount of pore volume that is supplied by pores in the material which have a radius of about 5 Angstrom units or less. Preferably, this high severity calcination is conducted long enough to provide the alumina particles with a surface area below about 350, most preferably in the range of about 125 to 300, square meters per gram.

Generally suitable calcining temperatures for step (iii) are in the range of about 800 to 1800°F. If, however, there is a substantial absence of water vapor in the calcining atmosphere, then temperatures of at least about 1200°F. should generally be used, preferably about 1200 to 1500°F. Where, considering the other extreme, the calcining atmosphere is approximately all water vapor, then temperatures about as low as the aforementioned 800°F. can be employed, and, while higher temperatures can, if desired, be used, it is usually preferred when using the 100% water vapor atmosphere to calcine at up to about 1200°F. In an advantageous embodiment of the present invention the calcining of step (iii) is conducted at a temperature of about 900 to 1300°F. and in the presence of air which contains at least a sufficient amount of water vapor to be saturated therewith at about 70-80°F.

The calcination can be effected in an oxidizing, reducing or inert atmosphere, but no apparent advantage resides in the use of the latter two; therefore, the more economical use of air as the calcining atmosphere is preferred. It is usually advantageous to calcine in a flowing stream of the gaseous atmosphere. Pressures can be atmospheric, super-atmospheric or sub-atmospheric. It will generally be most convenient, however, to calcine under about 1 to 10 atmospheres pressure.

Where the macrosize particles contain significant amounts, say about 5 weight percent or more, of uncombined water — as, for example, will usually be the case where the particles have been formed by extrusion — then, either as a separate operation or in the first stage of the calcination, the particles can with advantage first be dried at temperatures below the critical temperature of water, which is about 705°F. Higher temperatures can cause fissures and rupture of the particles. Thus, prior to the particles being heated to as high as about 700°F., preferably prior to being heated above about 400°F., their uncombined water content should be lowered to at least below about 5 weight percent of the composition.

Impregnation of the calcined particles according to step (iv) of the process places the platinum series metal and the rhenium on the alumina support. The final, calcined catalyst is to have about 0.1 to 1 weight percent of platinum series metal and about 0.1 to 2 weight percent of rhenium (calculated as the free metals). Any suitable platinum series metal and rhenium compounds can be employed. Most preferred of the platinum series metals — especially where the intended use of the catalyst is in a reforming operation — is platinum itself. Of the many water-soluble platinum compounds which can be used in the process of the present invention there may be mentioned, for example, the haloplatinic acids, such as chloroplatinic acid and bromoplatinic acid; tetraammineplatinous hydroxide; tetraammineplatinic hydroxide; tetraammineplatinous chloride; tetraammineplatinous bromide; diamminedinitritoplatinum (II); hexathiocyanatoplatinic acid and ammonium hexathiocyanoplatinate (IV). As suitable water-soluble rhenium compounds there may be mentioned, for example, perrhenic acid and ammonium perrhenate. It is generally preferred that sufficient rhenium compound be employed to provide a weight ratio or rhenium to platinum series metal (again calculated as the free metals) in the final, calcined catalyst in the range of about 1/5 to 5/1.

The impregnation can be by any suitable method, as, for example, by simple admixing, vacuum impregnation, etc. The impregnating solution is an aqueous solution of the water-soluble platinum series metal and rhenium compounds. Although it may often be preferred to use a single solution containing both metal compounds (thus assuring uniform distribution of the metals on the substrate), it is also within the purview of the invention to apply the metals from separate solutions, either simultaneously or sequentially, and in any order. Where separate impregnation steps are employed there may be interposed between them another calcination step, preferably, however, a less severe calcination than that of step (iii), for instance, employing the conditions of step (v), discussed hereinafter.

It is also preferred that the concentration of the impregnating solution be sufficiently high that the amount of solution required to provide the desired concentration of the metals will not be in substantial excess of that required to thoroughly wet the particles. In other words, the impregnation will advantageously be effective to just saturate the calcined particles and no more. Certain rhenium and platinum series metal compounds, while nominally water-soluble, may, however, be difficult to get into solution in pure — i.e., deionized — water in other than extremely dilute concentrations. Adjustment of the pH of the water, as, for example, by addition of a base, may enhance the solubilization. For such pH adjustment there should be used those compounds, e.g. acids and bases, the presence of which will not be unduly deleterious in the final catalyst composite or which can be later removed from the composite, for example via washing with water, or during calcination. Thus, for example, of the platinum compounds mentioned above, diamminedinitritoplatinum(II), which may be represented by the formula $Pt(NH_3)_2(NO_2)_2$, is not sufficiently soluble in pure water to obtain solution concentrations of greater than about 0.5 weight percent. To obtain more concentrated aqueous solutions thereof, the water can be alkalinized by the addition of, for instance, ammonium hydroxide.

Recalcining of the impregnated macrosize particles according to step (v) of the process is performed under generally less severe conditions than in the first calcining, but at temperatures sufficient to effect release of any water of hydration that is present in the impregnated particles. Generally suitable are temperatures of about 600 to 1200°F., preferably about 850 to 1000°F. Although recalcination can be effected in an inert atmosphere such as nitrogen, it is preferred to employ either an oxidizing or reducing environment. Thus, either oxygen-containing gases, such as dry air, or hydrogen-containing gases are advantageously employed. Inert diluent gases such as nitrogen can be present in admixture with the oxygen or hydrogen. It is usually advantageous to conduct the recalcination in a flowing stream of the gaseous atmosphere. Atmospheric, superatmospheric or sub-atmospheric pressures can be employed. As in the initial calcination treatment, it is also preferred here, and for the same reasons, that the particles, prior to being heated to as high as about 700°F., preferably prior to being heated to above about 400°F., have their uncombined water content lowered to at least below about 5 weight percent of the composition. The recalcined particles will generally have a surface area of about 125 to 300 square meters per gram and a total pore volume of about 0.5 to 0.8 cubic centimeters per gram.

The alumina support of the catalyst prepared by the process of the present invention can, if desired, additionally contain a minor proportion of acidic support materials. Generally, these acidic materials will be mixed oxide structures prepared from metals whose co-ordination numbers are different. As examples of such may be mentioned amorphous, synthetic silicaalumina gels and crystalline aluminosilicates, the latter having a molar ratio of silica to alumina of at least about 2.0 or 2.5 and containing uniform pore openings having diameters of about 6 to 15 A, preferably about 10 to 14 A. Of the crystalline alumino-silicates, most preferred are those which have been cation-exchanged with ammonium, hydrogen or rare earth metal ions or with combinations of such ions. Whether or not it is desirable to include acidic materials in the support depends upon the use to which the catalyst is to be put. Similarly, the intended use for the catalyst dictates the amount to be employed of the additive and its degree of intrinsic acidity. It is usually preferred that the amount of acidic material employed be about 5 to 35 weight percent of the overall catalyst. The acidic support material, where employed, can be incorporated in the catalyst composite according to methods well known in the art. Preferably, the acidic material is added to the hydrated alumina slurry or macroforming mix, or is formed in situ therein. Another source of acidic promoter which can be incorporated in the catalyst composites prepared by the method of the present invention is halide ion, such as fluoride or chloride ion. Preferably, such is added after the recalcining treatment of step (v). The addition can be by methods known in the art. For instance, the calcined composite can be treated with dilute, gaseous HCl, for example in admixture with an inert gas such as nitrogen. Also, the catalyst can be treated with an aqueous solution of, for example, HCl and then calcined a third time. Chloride is generally the most preferred of the halide promoters.

As stated above, catalysts prepared by the process of the present invention exhibit improved activity and stability, especially in the reforming of naphtha feeds. In general, they can be employed under the usual conditions of reforming. The hydrocarbon stock to be reformed is contacted with the catalyst in a reaction zone at an elevated temperature within the range of about 700 to 1200°F., preferably about 750 to about 1000°F., under a total pressure of about 50 to about 100 p.s.i.g., preferably about 100 to 350 p.s.i.g., and a hydrogen partial pressure approximating from about 3 to about 20 moles of hydrogen per mole of hydrocarbon charge stock. The catalyst is conveniently handled in the form of pellets or tablets which are placed in the reaction zone in the form of a fixed bed. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases, which usually approximate upwards of about 70% hydrogen, are recovered for recycle. The liquid products then are fractionated in the usual way for recovery of a stabilized gasoline reformate or for recovery of the selected aromatic hydrocarbons. The optimum processing conditions vary according to the nature of the feedstock, particularly its naphthene content and boiling range. The conditions selected also must account for the nature of the desired products and for the individual selectivity of the particular catalyst.

The invention will be better understood by reference to the following examples.

EXAMPLE I

An aqueous slurry of hydrated alumina is prepared by neutralizing an aqueous aluminum chloride solution with ammonium hydroxide, while maintaining the pH of the mixture at about 8. The resulting hydrated alumina precipitate is washed with water to lower its chlorine content to about 0.1 weight percent and is then reslurried in water and aged until X-ray diffraction analysis of a dried sample shows about a 67 weight percent content of alumina trihydrate, made up entirely of bayerite and nordstrandite. Gaseous carbon dioxide is then bubbled into the slurry until the pH is lowered to about 6, at which level trihydrate formation ceases. The resultant slurry is filtered and the filter cake dried at 230°F., and then mulled with deionized water to form an extrudable mix. The mix is extruded through a 1/16 inch diameter die and the extrudate is re-dried at 230°F. The dried extrudate is broken into lengths ranging from about one-eighth of an inch to about three-eighths of an inch and then screened free of fines.

The extrudate is then calcined, first for 3 hours at 900°F. in a flowing stream of dry air, then for 3 more hours at 1200°F. in a stream of air which is saturated with water at 76°F. The calcined extrudate is cooled in dry air and then 199 grams thereof (equalling 197.6 g. on an ignited weight basis) is vacuum impregnated with 190 ml. of an aqueous solution of chloroplatinic acid containing the equivalent of 1.2 g. of metallic platinum. The impregnated extrudate is partially dried in a rotating, evacuated flask and then dried for 18 hours in a forced draft oven at 230°F. After calcining in a stream of dry air at 900°F. for 3 hours, the extrudate is cooled and then impregnated with 190 ml. of an aqueous solution of perrhenic acid containing the equivalent of 1.2 g. of metallic rhenium. The product is then redried and recalcined in a stream of dry air at 900°F. for 3 hours. Analysis of the catalyst is as in Table I, following.

EXAMPLE II

A hydrated alumina slurry is prepared and aged as in Example I. After adjusting the pH to about 6 with carbon dioxide, 24 kilograms of the slurry (containing 2.4 kg. of $Al_2O_3$) is stirred vigorously while there is added thereto 288 ml. of an aqueous solution of chloroplatinic acid (containing the equivalent of 50.3 milligrams of metallic platinum per milliliter of solution). Following that, 13.26 ml. of an aqueous solution of perrhenic acid (containing the equivalent of 1.3 g. of metallic rhenium per milliliter of solution) is diluted with deionized water to a volume of 250 ml. and is also added, with vigorous stirring, to the slurry. The slurry is stirred for an additional 30 minutes and then there is added thereto 3360 ml. of water which is saturated with hydrogen sulfide. After stirring for 30 more minutes, the pH of the slurry is adjusted to about 8 with ammonium hydroxide. After stirring for 10 more minutes, the slurry is dried in a forced draft oven at 230°F. for 18 hours. The resultant material is then mulled with water to form an extrudable mix which is then extruded, dried, broken and screened as in Example I. The dried extrudate is then calcined for 3 hours at 900°F. in a rapid stream of dry air. The catalyst analyzes as in Table I, hereinafter.

EXAMPLE III

The catalysts of Examples I and II are tested in a 1-inch diameter, bench-scale reforming unit. Twenty grams of catalyst is diluted with tabular alumina and charged to the reactor. A mid-continent naphtha is combined with hydrogen and passed over the catalyst, which is held at constant temperature in a radiant electric furnace. Liquid product from the reaction is collected in a high-pressure flash pot. Gas from the high-pressure flash is combined with reactor exit gas and passed through a Dry Ice-isopropanol trap. The liquid product and wet gas from the trap are combined and weathered for 1 hour at 100°F. The weathered product is submitted for research octane (clear) determination.

Feedstock inspections are given in Table II. Test conditions are 950°F., 4g. feed/g. catalyst/hour, 3/1 molar ratio of hydrogen to hydrocarbon, and 300 psig reactor pressure. Tests are made periodically for 168 hrs. A linear loss in octane is observed as the catalysts age during this period. The rate of the octane number decline (DRON/100 hrs.) and the initial octanes extrapolated to zero time are given in Table III.

TABLE I

Catalyst Analysis Data

| Catalyst | Example I | Example II |
|---|---|---|
| Surface Area, m²g. | 189 | 408 |
| Total Pore Vol., cc/g. | 0.570 | 0.557 |
| %V.M. | 1.89 | 3.92 |
| %Pt | 0.609 | 0.554 |
| %Re | 0.66 | 0.603 |
| %Cl | 0.66 | 0.61 |
| Chemisorption, cc/g. | 0.69 | 0.208 |

TABLE II

Feedstock Inspection Data

| Catalyst | Example I | Example II |
|---|---|---|
| ASTM Distillation, °F. | | |
| IBP | 208 | 192 |
| 5 | 246 | 212 |
| 10 | 252 | 216 |
| 20 | 260 | 228 |
| 30 | 268 | 237 |
| 40 | 277 | 247 |
| 50 | 286 | 262 |
| 60 | 297 | 276 |
| 70 | 310 | 187 |
| 80 | 327 | 310 |
| 90 | 237 | 332 |
| 95 | 363 | 346 |
| EP | 400 | 377 |
| Gravity, °API | 55.0 | 56.1 |
| Molecular Weight | 118 | 117 |
| Hydrogen, % | 14.57 | 14.57 |
| Nitrogen, ppm | 1.1 | 2 |
| Sulfur, % | 0.001 | 0.001 |

TABLE III

Reformate Analysis Data

| Catalyst | Example I | Example II |
|---|---|---|
| Initial RON | 101.7 | 98.6 |
| DRON/100 hrs. | 2.6 | 6.6 |

EXAMPLE IV

Pure aluminum is dissolved in pure hydrochloric acid and the resultant aluminum chloride solution is mixed with sufficient deionized water to yield an aqueous aluminum chloride solution of a concentration equivalent to about 65 grams of $Al_2O_3$ per liter. An aqueous ammonium hydroxide solution is prepared to a concentration of about 65 grams of $NH_3$ per liter. The aluminum chloride and ammonium hydroxide solutions are then mixed together at about 100°F., in a volume ratio of about 1:1, while maintaining the pH of the mixture at about 8. The resulting hydrated alumina precipitate is filtered from the mother liquor on a rotary vacuum filter and then washed on the filter with deionized water. The washed filter cake is slurried in deionized water; the pH of the slurry is adjusted to about 9; the slurry is filtered and the filter cake washed again. This cycle of slurrying, pH adjusting, filtering and washing is performed 4 times using the rotary vacuum filter, followed by 2 times using a filter press. The filter cake from the final washing typically has a chlorine content of about 0.01 weight percent. After aging for several days, the filter cake typically has a composition, on a dried hydrate basis, of about 18 weight percent gibbsite, 38 weight percent bayerite, 29 weight percent nordstrandite, 13 weight percent boehmite and 2 weight percent amorphous hydrous alumina. A portion of the aged mixture of hydrated aluminas is added to the deionized water to yield 10 kg. (kilograms) of a slurry containing about 10 weight percent of alumina (calculated as $Al_2O_3$).

The slurry is spray dried and to the resultant microspheres is then added sufficient deionized water to provide an extrusion mix containing about 30 weight percent free moisture. The resultant mix is extruded into cylindrical pellets of about 1/16 inch diameter and about ⅛ inch length. The resultant pellets are re-dried for 16 hours at 230°F. and then calcined for 3 hours at 1200°F. 1050°F. in a flowing stream of air which has been saturated with water vapor at room temperature (about 70°F.).

The calcined pellets, which have a surface area of about 200 square meters per gram, are permitted to cool and are then impregnated with an aqueous solution of chloroplatinic acid and perrhenic acid in an amount sufficient to provide a final catalyst containing about 0.6 weight percent of each of the metals (calculated as the free metals). The impregnating solution is of sufficient concentration that it substantially thoroughly wets the pellets and no more. The resultant, impregnated pellets are re-dried for 16 hours at 230°F. and then recalcined for 3 hours at 900°F. in a flowing stream of dry air to obtain a final catalyst having a surface area of about 200 square meters per gram and a total pore volume of about 0.55 cubic centimeters per gram.

EXAMPLE V

The catalyst of Example IV is evaluated, using bench scale equipment as in Example III, for the reforming of naphtha. The feed stock used is a desulfurized, straight run, mid-continent naphtha having a distillation range of about 200 to 400°F. Test conditions include a temperature of about 925°F., a WHSV (weight hourly space velocity) of about 3, a pressure of about 200 p.s.i.g. (pounds per square inch gauge), and a molar ratio of recycle gas to naphtha feed of about 10 to 1. Results of the bests show that the catalyst exhibits high stability and performance.

It is claimed:

1. A process for preparing an alumina-supported, rhenium and platinum series metal-containing, calcined catalyst which comprises the following steps:
   i. drying an aqueous slurry of hydrated alumina to obtain a mixture which can be formed into macrosize particles;
   ii. forming the mixture into macrosize particles;
   iii. calcining the particles at a temperature from about 800 to 1800°F. so as to provide the particles with a surface area of below about 350 square meters per gram, with the proviso that said calcining is conducted at at least about 1200°F. when it is conducted in the substantial absence of water vapor;
   iv. impregnating the calcined particles with aqueous solution of water-soluble platinum series metal acid or salt and aqueous solution of water-soluble rhenium acid or salt in an amount sufficient to provide about 0.1 to 1 weight percent of said platinum series metal and about 0.1 to 2 weight percent of said rhenium, calculated as the free metals, in the final catalyst; and
   v. recalcining the impregnated particles at a temperature from about 600 to about 1200°F.

2. The process according to claim 1 wherein the calcining of step (iii) is conducted in the presence of air.

3. The process according to claim 1 wherein the calcining of step (iii) is conducted at a temperature of about 900 to 1300°F. and in the presence of air which contains sufficient water vapor to be saturated at about 70–80°F.

4. The process according to claim 3 wherein the platinum series metal is platinum.

5. The process according to claim 3 wherein the drying of step (i) is conducted at a temperature of up to about 400°F.

6. The process according to claim 3 wherein the rhenium compound employed in step (iv) is selected from the group consisting of perrhenic acid, ammonium perrhenate, and mixtures of the foregoing.

7. The process according to claim 3 wherein the platinum series metal compound employed in step (iv) is chloroplatinic acid.

8. The process according to claim 3 wherein the particles formed in step (ii) have a minimum dimension of at least about 0.03 inch and a maximum dimension of up to about 1 inch.

9. A process for preparing an alumina-supported, rhenium and platinum-containing, calcined catalyst which comprises the following steps:
   i. drying an aqueous slurry of hydrated alumina to obtain a mixture which can be extruded into macrosize particles, said slurry containing about 5 to 16 weight percent of alumina, calculated as $Al_2O_3$;
   ii. extruding the mixture into particles having a minimum dimension of at least about 0.03 inch and a maximum dimension of up to about 0.5 inch;
   iii. calcining the extrudate so as to provide the particles with a surface area of about 125 to 300 square meters per gram, said calcining being accomplished by drying the extrudate at a temperature up to about 400°F. to lower the uncombined water content to less than about 5 percent, based on the weight of the extrudate, and then heating the dried extrudate to a temperature of about 900 to 1300°F. in the presence of air which contains sufficient water vapor to be saturated at about 70–80°F.
   iv. impregnating the calcined extrudate with aqueous solution of chloroplatinic acid and aqueous solution of a rhenium compound selected from the group consisting of ammonium perrhenate, perrhenic acid, and mixtures of the foregoing in an amount sufficient to provide about 0.1 to 1 weight percent of said platinum and about 0.1 to 2 weight percent of said rhenium, calculated as the free metals, in the final catalyst; and
   v. recalcining the impregnated extrudate, said recalcining being accomplished by drying the impregnated extrudate at a temperature of up to about 400°F. to lower the uncombined water content to less than about 5 percent, based on the weight of the extrudate, and then heating the dried extrudate in dry air to a temperature from about 850 to about 1000°F.

* * * * *